United States Patent
Duckwall, Jr. et al.

(10) Patent No.: US 6,391,411 B1
(45) Date of Patent: May 21, 2002

(54) MACHINE DIRECTION ORIENTED HIGH MOLECULAR WEIGHT, HIGH DENSITY POLYETHYLENE FILMS WITH ENHANCED WATER VAPOR TRANSMISSION PROPERTIES

(75) Inventors: Louis R. Duckwall, Jr., Marietta, GA (US); David H. Bostian, Cincinnati; Eric Hatfield, Montgomery, both of OH (US)

(73) Assignee: Printpack Illinois, Inc., Elgin, IL (US)

( * ) Notice: Subject to any disclaimer, the term of this patent is extended or adjusted under 35 U.S.C. 154(b) by 0 days.

(21) Appl. No.: 09/324,937

(22) Filed: Jun. 3, 1999

(51) Int. Cl.[7] ............ B29D 22/00; B32B 7/02; B32B 27/32; B32B 3/20; B65D 30/08
(52) U.S. Cl. ............ 428/35.7; 428/35.7; 428/212; 428/220; 428/910; 428/523; 383/113; 383/116; 383/908; 264/176.1
(58) Field of Search ............ 428/35.2, 35.7, 428/910, 212, 220, 343, 35.9, 523, 172.1; 383/908, 113, 116; 264/210.1, 288.4, 173.19, 176.1

(56) References Cited

U.S. PATENT DOCUMENTS

| | | | |
|---|---|---|---|
| 3,076,232 A | 2/1963 | Dengler | 18/48 |
| 3,265,790 A | 8/1966 | Kirk et al. | 264/95 |
| 3,491,185 A | 1/1970 | Rasmussen | 264/288 |
| 3,663,662 A | 5/1972 | Golike et al. | 260/897 |
| 3,962,205 A | 6/1976 | Ward et al. | 526/352 |
| 3,998,914 A | 12/1976 | Lillis et al. | 260/897 |
| 4,183,893 A | 1/1980 | Eastwood et al. | 264/288.4 |
| 4,209,126 A | 6/1980 | Elias | 229/43 |
| 4,226,905 A | 10/1980 | Harbourne | 428/220 |
| 4,355,076 A | 10/1982 | Gash | 428/411 |
| 4,429,079 A | 1/1984 | Shibata et al. | 525/240 |
| 4,456,660 A | 6/1984 | Columbo | 428/516 |
| 4,629,525 A * | 12/1986 | Rasmussen | 156/84 |
| 4,636,340 A | 1/1987 | Itaba et al. | 264/22 |
| 4,681,781 A * | 7/1987 | Murray et al. | 428/35 |
| 4,770,912 A | 9/1988 | Furrer et al. | 428/35 |

(List continued on next page.)

FOREIGN PATENT DOCUMENTS

JP 92-91926 3/1992

OTHER PUBLICATIONS

Plastics Engineering, Aug. 1991, p. 45, Column 2.*
Plastics Engineering, Aug. 1991, p. 45, Column 3.*
Braselmann & Barry, "High Molecular Weight/Medium Molecular Weight High Density Polyethylene Extrusion and Fabrication Techniques for Grocery Sacks and Merchandise Bags", *1984 Polymers, Laminations and Coatings Conference*, pp. 151–155.
Holden, et al., "A Study of the Gas Barrier Properties of Highly Oriented Polyethylene", *J. Polymer Science*, pp. 709–730 (1985).

(List continued on next page.)

*Primary Examiner*—Rena L. Dye
*Assistant Examiner*—Michael C. Miggins
(74) *Attorney, Agent, or Firm*—Sutherland Asbill & Brennan, LLP

(57) ABSTRACT

The present invention is directed to oriented high molecular weight, high density polyethylene (HMW HDPE) films having enhanced water vapor transmission properties, as well as, superior toughness properties, and articles made therefrom. The present invention is also directed to a method of making machine direction oriented HMW HDPE films having enhanced water vapor transmission properties and superior toughness properties, and articles made therefrom. The present invention is further directed to articles, particularly bags, made from machine direction oriented HMW HDPE films having enhanced water vapor transmission properties and superior toughness properties.

24 Claims, 1 Drawing Sheet

U.S. PATENT DOCUMENTS

| | | | |
|---|---|---|---|
| 4,808,359 A | | 2/1989 | van der Molen ............. 264/171 |
| 4,828,928 A | | 5/1989 | Shah ........................... 428/518 |
| 4,870,122 A | | 9/1989 | Lu ............................. 524/488 |
| 4,891,173 A | | 1/1990 | Saitoh et al. .................. 264/22 |
| 4,916,025 A | | 4/1990 | Lu ............................. 428/516 |
| RE33,264 E | | 7/1990 | Baxley et al. ............... 206/554 |
| 4,954,391 A | | 9/1990 | Kotani et al. ............... 428/220 |
| 5,006,378 A | | 4/1991 | Itaba et al. ................. 428/34.9 |
| 5,043,204 A | | 8/1991 | Itaba et al. ................. 428/213 |
| 5,045,620 A | | 9/1991 | Itaba et al. ............... 526/348.1 |
| 5,080,849 A | | 1/1992 | Bastiaansen et al. ..... 264/210.1 |
| 5,091,228 A | | 2/1992 | Fujii et al. ................. 428/34.3 |
| 5,145,728 A | | 9/1992 | Itaba et al. ................. 428/213 |
| 5,205,650 A | * | 4/1993 | Rasmussen ................. 383/107 |
| 5,205,974 A | | 4/1993 | Bastiaansen et al. ........ 264/210 |
| 5,223,346 A | | 6/1993 | Lu ............................. 428/516 |
| 5,254,617 A | | 10/1993 | Inoue et al. ................. 524/433 |
| 5,302,442 A | | 4/1994 | O'Brien et al. ............. 428/213 |
| 5,335,788 A | | 8/1994 | Beasley et al. ............. 206/554 |
| 5,626,944 A | * | 5/1997 | Rasmussen ................. 428/172 |
| 5,635,262 A | | 6/1997 | Best et al. ................ 428/36.92 |
| 5,714,547 A | | 2/1998 | Li et al. ...................... 525/240 |

OTHER PUBLICATIONS

David E. James (?), "High Density Polyethylene" in *Ethylene Polymers*, vol. 6, pp. 454–465.

Peter W. Manders, "New Branches of the Polymer Family Extend Into Specialized Applications", *Modern Plastics*, pp. B3–B5 (1994).

Seintsch & Braselmann, "Further Evaluations of High Molecular Weight, High Density Polyethylene Film Processing and Effects on Film Processing and Effects on Film Properties", *TAPPI Paper Synthetics Conference*, Washington, D.C., 1979.

Sneller, "What Could Be New In Grooved–Feed Extruders? For Starters, How about Improved Productivity?", (Mar. 1992), *Modern Plastics*, pp. 50–52 (Mar. 1992).

\* cited by examiner

APPARATUS FOR UNIDIRECTIONALLY ORIENTING FILMS.

MACHINE DIRECTION ORIENTED HIGH MOLECULAR WEIGHT, HIGH DENSITY POLYETHYLENE FILMS WITH ENHANCED WATER VAPOR TRANSMISSION PROPERTIES

FIELD OF THE INVENTION

The present invention is directed to machine direction oriented high molecular weight, high density polyethylene (HMW HDPE) films having enhanced water vapor transmission properties and superior toughness properties, and articles made therefrom. The present invention is also directed to a method of making machine direction oriented HMW HDPE films having enhanced water vapor transmission properties and superior toughness properties, and articles made therefrom. The present invention is further directed to articles, particularly bags, made from machine direction oriented HMW HDPE films having enhanced water vapor transmission properties.

BACKGROUND OF THE INVENTION

Low molecular weight high density polyethylene (LMW HDPE) film and medium molecular weight high density polyethylene (MMW HDPE) film are widely used in a number of commercial applications, including packaging materials, due to the desirable properties of the films. LMW HDPE and MMW HDPE films possess good moisture barrier properties, tensile strength, tear resistance, and compatibility with other polymeric materials for making composite films. Although these HDPE films have desirable properties for many packaging applications, there exists a need for better moisture barrier properties in some applications, such as for dry goods like cereal.

One method of improving the moisture barrier properties of HDPE film is to monoaxially orient the film. Several U.S. patents disclose a method of monoaxially orienting a HDPE film to improve the water vapor transmission of the film. See for example U.S. Pat. No. 4,183,893 to Eastwood et al. and U.S. Pat. No. 4,870,122 to Lu. Even though monoaxially orienting a HDPE film improves the water vapor transmission properties of the film, monoaxially orienting the film negatively impacts the puncture resistance and tear strength of the film, especially in the machine direction. Further, known methods of monoaxially orienting a HDPE film, where the goal is improved water vapor transmission rate, leave an undesirable high shrinkage rate when exposed to heat. In many packaging applications, the film material must be heat sealed to seal the packaged material from exposure to air and moisture. During the heat sealing process, nominally improved water vapor transmission rate film materials, using LMW and MMW HDPE materials, exhibit unsatisfactory shrinkage, puncture resistance, and tear strength, resulting in an unacceptable package.

Although LMW HDPE and MMW HDPE materials have experienced wide use as packaging materials, high molecular weight high density polyethylene (HMW HDPE) has been used very little as a moisture barrier packaging material due to its inherent processability problems. The low melt index of HMW HDPE leads to processing difficulties during an extrusion process. Further, the poorer, higher water vapor transmission rate of HMW HDPE material has prohibited many manufacturers from using HMW HDPE in packaging applications, due to the resulting need to produce much thicker films at too high a total material cost.

What is needed in the art is a film having superior water vapor transmission properties, minimal shrinkage when exposed to a heat sealing operation, high puncture resistance, and sufficient tear strength in both the machine and cross directions to be used as a packaging material for dry goods. Further, what is needed in the art is a film, which exhibits the desirable above-mentioned properties, and which may be downgauged to a desirable thickness that avoids the high costs associated with thicker films.

SUMMARY OF THE INVENTION

The present invention is directed to a unidirectionally oriented film comprising high molecular weight (HMW) high density polyethylene (HDPE). The oriented HMW HDPE films of the present invention possess substantially improved water vapor transmission rate (WVTR) and minimal shrinkage, while maintaining superior puncture resistance and tear strength.

The present invention is also directed to a method of making the above-described films. The method comprises forming a film comprising HMW HDPE, and subsequently orienting the film in the machine direction. The film may be formed by a film blowing process or cast extrusion process. The film may be formed as a single layer film or a multi-layer film comprising x layer sets, wherein each layer set comprises a layer containing HMW HDPE.

The present invention is further directed to articles of manufacture made from the above-described films. In one preferred embodiment, bags for packaging dry foods, such as cereal, are produced from the films.

These and other features and advantages of the present invention will become apparent after a review of the following detailed description of the disclosed embodiments and the appended claims.

DESCRIPTION OF THE PREFERRED EMBODIMENTS

Figure 1:
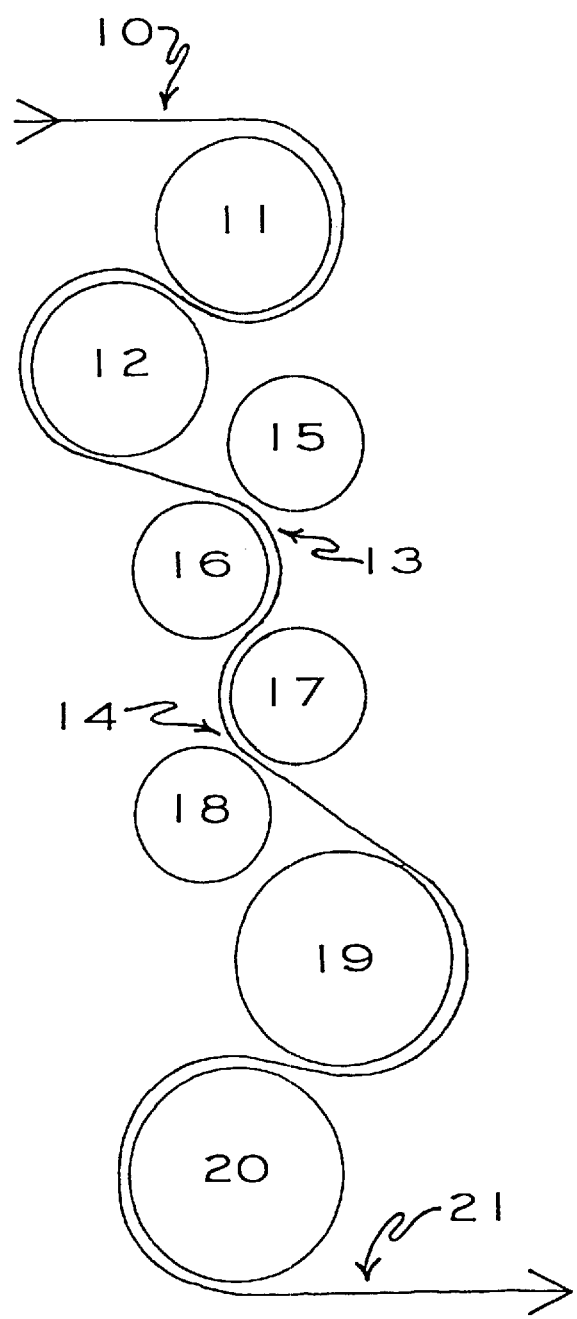
FIG. 1 illustrates the apparatus for unidirectionally orienting the films of the present invention.

The present invention is directed to a unidirectionally oriented film comprising high molecular weight (HMW) high density polyethylene (HDPE). As used herein, "high molecular weight" (HMW) refers to a molecular weight range, both weight average and number average molecular weight, of about 1.3 to about 2.9 million, desirably about 1.5 to about 2.5 million. As used herein, "high density polyethylene" (HDPE) refers to a polyethylene having a density range of about 0.941 to about 0.970 g/cc, desirably about 0.946 to about 0.968 g/cc. Desirably, the melt index range of the HMW HDPE used in the present invention is from about 1.0 to about 0.008 g/10 min, more desirably from about 0.3 to about 0.01 g/10 min, and even more desirably from about 0.1 to about 0.01 g/10 min.

The high density polyethylene of the present invention may comprise an ethylene homopolymer, a copolymer of ethylene and up to about 5 weight percent of one or more monomers, and any combination thereof. Suitable monomers for polymerization with the ethylene monomer include, but are not limited to, propylene, butene-1, hexene-1, and combinations thereof. Some well known commercial HMW HDPE resins suitable for use in the present invention include, but are not limited to, those specified in Table 1 below. The high density polyethylene of the present invention may also comprise a composition containing the high density polyethylene and one or more additives including, but not limited to, antioxidants, pigments, antiblock, slip, inorganic fillers, and other additives.

TABLE 1

| Resin Supplier | Resin Name, Designation | Density (g/cc) | Melt Index (g/10 min) |
|---|---|---|---|
| Equistar Chemical, LP | L4903 | 0.950 | 0.027 |
| Exxon Chemical Co. | HD-7755 | 0.952 | 0.065 |
| Fina Chemical Co. | 2344 | 0.946 | 0.090 |
| Mitsui Chemical Co. | 7000 F | 0.956 | 0.040 |
| Asahi Chemical Co. | F181S | 0.950 | 0.060 |
| Nippon Polyolefin | E905 | 0.946 | 0.050 |
| Hostalen Polymers | GM 9255 F | 0.950 | 0.070 |

The films of the present invention may comprise a single layer of HMW HDPE or a multi-layer composite comprising at least one layer of HMW HDPE and at least one additional layer. The films of the present invention may be formed simultaneously with or subsequently laminated to suitable films by processes including, but not limited to, adhesive and extrusion lamination processes. Suitable laminating films include, but are not limited to, polymeric films, metallized polymer films, metal foils, fabrics, paper and paper products, adhesive layers, release layers, and a combination thereof. Suitable polymeric coextruded film layers include, but are not limited to, layers of ethylene-vinyl acetate (EVA) copolymers, ethylene-methacrylic acid salt ionomers, polypropylene, linear low density polyethylene (LLDPE), low density polyethylene (LDPE), and blends thereof. The multi-layer composites may also comprise a thin "barrier" layer, which provides a barrier to oxygen or organic materials. The barrier layer may be internal to the composite structure and/or on an outer surface of the composite structure. The barrier layer may comprise, but is not limited to, nylon, ethylene-vinyl alcohol copolymer, polyester, or a combination thereof. If needed, one or more layers of the composite structure may be adhered to one another by a coextrudable adhesive layer (CAL). Suitable CAL materials for use in the present invention include, but are not limited to, DuPont's BYNEL™ products, Mitsui's ADMER™ products, and Equistar's PLEXAR™ products.

The present invention is also directed to a method of making the above-described films. The method comprises forming a film comprising HMW HDPE, and subsequently orienting the film in the machine direction. The film may be formed by a HMW HDPE film blowing process or a HMW HDPE cast extrusion process, both of which are well known to those of ordinary skill in the art.

In one embodiment of the present invention, a HMW HDPE film is made by a film blowing process, wherein HMW HDPE material is extruded, preferably between 400° F. and 500° F. (200° C. –260° C.), through an annular die to form a tube. The diameter of the annulus may vary significantly, depending on whether a "high stalk" or "in pocket" blown extrusion is desired. Further, the die gap may also vary as desired, but is typically between about 30 and 100 mils (0.8 and 2.5 mm).

A "high stalk" blown extrusion die diameter is typically about 10 inches (~250 mm). The extrudate exits the die in the form of a tubular "stalk," having a diameter that is approximately the same as the diameter of the annulus. Desirably, the stalk has a length of about four to nine times the diameter of the annulus, more desirably about six and eight times the diameter of the annulus. The length of the stalk may be controlled with air rings, which cool the film to a temperature below the softening point of the HMW HDPE film, typically below 135° C. Following the extrusion step, the tubular film is inflated to a final diameter greater than the original stalk diameter by injecting cooled air (typically cooler than 25° C.) into the tubular film. The blow up ratio, or the ratio of final diameter to original diameter, is desirably between about 2 and 7, and more desirably between about 2.5 and 4.5.

An "in pocket" blown extrusion die diameter is typically about 20 inches (~500 mm). The extrudate exits the die in the form of a tube of the same diameter as that of the annulus. The tube is controlled with air rings, which cool the film to a temperature below the softening point of the HMW HDPE. An "in pocket" tube diameter may be maintained at the original die diameter, or desirably inflated to a diameter between 1.5 and 4 times the die diameter, or more desirably between 2 and 3 times the die diameter. Unlike the "high stalk" process wherein the extruded tube is inflated a distance (i.e., the length of the stalk) from the extrusion die, the extruded tube in the "in pocket" process is typically inflated as the tube exits the extrusion die.

The take-off speed of a "high stalk" or "in pocket" blown film is controlled by a nip at the top of a collapsing frame where the tube is flattened, and cools further to a temperature close to ambient temperature. The cooled tube may be wound onto a paper core, or other mandrel, or the tube may be slit open to form one or more films, which may be subsequently wound and stored prior to further processing. Alternatively, the tubular or slit film may proceed directly to the orientation process step.

The resulting film of the above-described film blowing processes may desirably have a film thickness of about 1 mil to about 14 mil. More desirably, the resulting film has a thickness of about 1.5 mil to about 8 mil.

In a further embodiment of the present invention, a HMW HDPE film is made by a cast extrusion process, wherein HMW HDPE material is extruded through a flat die onto a continuously moving cooling roll or onto a continuously moving stack of at least 2 rolls, which form a cooling and smoothing nip for transporting the resulting film to the orientation process or to storage on paper cores or mandrels. The material is extruded preferably between 450° F. and 500° F. (230° C. –260° C.), and the take-off speed of the extruded material is controlled to maintain the most uniform cross section of film in the cooling nip. The width of the die may vary as desired, but practically is typically between about 24 and 200 inches (60–500 cm). Further, the die gap may also vary as desired, but is typically between about 80 and 200 mils (2 and 5 mm). Following extrusion, the HMW HDPE film is cooled below the softening point of the HMW HDPE, typically about 135° C. The film exiting the cooling nip described above may be further cooled to ambient temperature for winding onto a paper core or mandrel and stored prior to further processing. Desirably, the film may proceed directly to the orientation process step at a temperature below the softening point of the HMW HDPE.

The resulting film of the above-described cast extrusion process desirably has a film thickness of about 1 mil to about 30 mil. More desirably, the resulting film has a thickness of about 2 mil to about 12 mil.

Following the film forming process step, the HMW HDPE film is unidirectionally oriented in the machine direction. Machine direction orientation of HMW HDPE may proceed by any process known to those of ordinary skill in the art. Machine direction orientation processes may include, but are not limited to, reinflation and reheating of a blown tube to a desired orientation temperature, between two nips, desirably the lead nip moving at substantially faster speed than the trailing nip; and reheating of a blown tube, a slit film, or a cast, nipped film, to a desired orientation temperature over a series of heated rolls directed toward two consecutive sets of nip rolls, wherein the lead nip rolls moving at substantially faster speed than the trailing nip. Most desirably as shown in FIG. 1, the formed HMW HDPE film 10 passes over heated rolls 11 and 12 through nip points 13 and 14. Heated roll 11 and 12 may be set at a temperature between 60° C. and 130° C., more desirably between 80° C. and 120° C., and most desirably between 95° C. and 105° C. The heated rolls 11 and 12 have a roll diameter typically between 15 and 25 inches to stabilize the temperature of film 10, on both sides, most desirably between 95° C. and 105° C. Nip rolls 15 and 16 form nip point 13, while nip rolls 17 and 18 form nip point 14. Desirably, the temperature of the nip rolls is held between 60° C. and 130° C., to maintain a stable temperature for the orientation of the HMW HDPE film. More desirably, the temperature of the HMW HDPE film at nip points 13 and 14 is from about 80° C. to 120° C. Even more desirably, the temperature of the HMW HDPE film at nip points 13 and 14 is from about 95° C. to about 105° C. The nip rolls roll diameters are desirably between 4 and 12 inches and are located in as close approximation as is practical to minimize the distance, or gap, between nip points 13 and 14. For example, the gap between rolls 15 and 17 is desirably between 0.020 and 0.100 inches, most desirably between 0.035 and 0.060 inches. The orientation gap is equal to the length of the tangent line between the contact points on the nip rolls 15 and 17. It is most desirable to minimize the length of this tangent line, which is most practically accomplished by minimizing the diameters of nip rolls 15 and 17. The minimum practical limit for the diameter of these rolls is about 4 inches, which will deflect or bow under the pressure of the orientation in the gap, without supporting backup rolls, between nip roll 15 and substantially faster moving roll 17. For example, the HMW HDPE film entering nip point 13 is maintained at linear speed $v_1$. Desirably, linear speed $v_1$ ranges from about 1 meter/min to about 40 meters/min. The rotational speed of nip rolls 15 and 16 is thus held constant at $v_1$. The rotational speeds of nip rolls 17 and 18 forming nip point 14 are held constant at a substantially faster rate, $v_2$, causing the HMW HDPE film 10 to be oriented unidirectionally. The oriented HMW HDPE film 10 exits nip point 14 at linear speed $v_2$, which ranges from about 3 meters/min to about 200 meters/min. The degree of orientation may be expressed as the draw ratio, the ratio of linear speed $v_2$ to linear speed $v_1$. Desirably, the draw ratio is from about 2 to about 10. More desirably, the draw ratio is from about 3 to about 8, and most desirably the draw ratio is from about 4 to about 5.

As oriented HMW HDPE film 21 exits nip point 14 traveling at linear speed $v_2$, the oriented HMW HDPE film 21 passes over heated rolls 19 and 20. Oriented HMW HDPE film 21 may be annealed by maintaining the film at a temperature desirably from about 180° F. to about 240° F. (about 80° C. to about 115° C.). The heated rolls 19 and 20 have a roll diameter between 15 and 25 inches to uniformly maintain the annealing temperature of both sides of oriented film 21 most desirably between 95° C. and 115° C. The annealing step improves thermal stability of the film so as to minimize shrinkage during storage and use. Oriented HMW HDPE film 21 is then cooled to ambient temperature and wound onto a paper core or mandrel. The oriented HMW HDPE film may be cooled by any method known in the art. Desirably, the oriented HMW HDPE film is cooled by passing the film over a cooling roll (not shown).

One advantage of the oriented HMW HDPE films of the present invention is that a very thin oriented HMW HDPE film having desirable properties for packaging applications may be produced by the above-described process. Desirably, a single layer of oriented HMW HDPE film of the present invention has a film thickness of less than about 6.0 mil. More desirably, a single layer of oriented HMW HDPE film of the present invention has a film thickness of from about 0.2 mil to about 6.0 mil. Even more desirably, a single layer of oriented HMW HDPE film of the present invention has a film thickness of from about 0.4 mil to about 3.0 mil. In one embodiment of the present invention, a single layer of oriented HMW HDPE film has a film thickness of from about 1.0 mil to about 3.0 mil.

The oriented HMW HDPE films of the present invention have unique, desirable properties as a result of the machine direction orientation (MDO) process described above. The oriented HMW HDPE films possess a surprisingly superior moisture vapor transmission rate (MVTR), high modulus, puncture resistance, and tear strength in the machine and cross directions, without undesirable shrinkage. Table 2 below illustrates some of the properties of a typical oriented HMW HDPE film of the present invention (Column 2) in comparison to a blown HMW HDPE film without machine direction orientation (Column 1) and a conventional blown, medium molecular weight HDPE film with machine direction orientation (Column 3).

TABLE 2

|  | Blown HMWHDPE No MDO | Blown HMWHDPE MDO Stretch 4.5:1 | Blown Conventional MMWHDPE MDO Stretch 3:1 |
|---|---|---|---|
| Film Thickness | 1.5 mil | 1.5 mil | 1.5 mil |
| MVTR (g/100 SI/day) | 0.72 | 0.12 | 0.16 |
| Tensile @ Break, MD | 12,000 psi | 37,000 psi | 12,000 psi |
| Modulus, MD | 137 kpsi | 300 kpsi | 220 kpsi |
| Tear, MD | 50 g | 30 g | 10 g |
| Scott Puncture | 3.1 kg | 3.4 kg | 1.6 kg |

The oriented HMW HDPE films of the present invention have a superior moisture vapor transmission rate (MVTR) as measured by ASTM F1249 and having units of grams of water vapor per 100 square inches per 24 hour period per mil of film thickness (expressed as g/100SI/day/mil). Desirably, the oriented HMW HDPE films of the present invention have an MVTR of less than about 0.24 g/100SI/day/mil. More desirably, the oriented HMW HDPE films of the present invention have an MVTR of less than about 0.12 g/100SI/day/mil. Even more desirably, the HMW HDPE films of the present invention have an MVTR of less than about 0.04 g/100SI/day/mil. In one embodiment of the present invention, the HMW HDPE films have a MVTR of from about 0.06 to about 0.10 g/100SI/day/mil.

In addition to superior moisture vapor transmission properties, the oriented HMW HDPE films of the present invention possess an Elmendorf tear strength by ASTM D-689 in both the machine and cross directions such that the film is suitable for use as a packaging material. Desirably, the oriented HMW HDPE films of the present invention have a notched tear strength in the machine direction of at least about 30 g. More desirably, the oriented HMW HDPE films of the present invention have a tear strength in the machine direction of at least about 40 g. Even more desirably, the oriented HMW HDPE films of the present invention have a tear strength in both the machine and cross directions of at least about 50 g. In one embodiment of the present invention, the oriented HMW HDPE films have a tear strength in the machine direction of from about 30 g to about 100 g. In a further embodiment of the present invention, the oriented HMW HDPE films have a tear strength in the machine direction of from about 30 g to about 50 g.

The oriented HMW HDPE films of the present invention also possess a superior Scott Puncture value as measured by ASTM F-1306 in units of kilograms per mil of film thickness (kg/mil). Desirably, the oriented HMW HDPE films of the present invention have a Scott Puncture value of greater than about 1.0 kg/mil. More desirably, the oriented HMW HDPE films of the present invention have a Scott Puncture value of greater than about 2.0 kg/mil. Even more desirably, the oriented HMW HDPE films of the present invention have a Scott Puncture value of greater than about 2.5 kg/mil. In one embodiment of the present invention, the oriented HMW HDPE films of the present invention have a Scott Puncture value of from about 2.0 kg/mil to about 2.6 kg/mil.

A further desirable property of the oriented HMW HDPE films of the present invention is low shrinkage at ambient or high temperature use conditions. Conventional machine direction oriented MMW HDPE films have a relatively high "snapback" property, which refers to the gradual or immediate percent shrinkage in the machine direction at ambient or high temperature exposure, once a stretching force in the machine direction is removed from the oriented film. Conventional oriented MMW HDPE films typically have a "snapback" value of from about 5% to about 10% at ambient temperatures. The oriented HMW HDPE films of the present invention possess a snapback value of less than about 3.0%. Desirably, the oriented HMW HDPE films of the present invention possess a snapback value of less than about 1.0%. Further, conventional oriented MMW HDPE films typically have a "snapback" value of between 30% and 40% at temperatures above 115° C. (240° F.). However, the oriented HMW HDPE films of the present invention desirably possess a snapback value of less than about 5% at temperatures above 115° C. (240° F.).

The oriented HMW HDPE films of the present invention possess a tensile strength in both the machine and cross directions as measured by ASTM D-828 in units of pounds per square inch (psi). Desirably a one inch wide strip at 1.5 mil thickness of oriented HMW HDPE film of the present invention has a tensile strength in both the machine and cross directions of at least about 6000 psi. More desirably, the oriented HMW HDPE films of the present invention have a tensile strength in the machine direction of at least about 30,000 psi. Even more desirably, the oriented HMW HDPE films of the present invention have a tensile strength in the machine direction of at least about 37,000 psi. In one embodiment of the present invention, the oriented HMW HDPE films have a tensile strength in the machine direction of 37,000 psi.

The oriented HMW HDPE films of the present invention also possess a high modulus value in both the machine and cross directions as measured by ASTM D-828 in units of pounds per square inch (kpsi). Desirably, the oriented HMW HDPE films of the present invention have a modulus value in both the machine and cross directions of at least about 160 kpsi. More desirably, the oriented HMW HDPE films of the present invention have a modulus value in both the machine and cross directions of at least about 200 kpsi. Even more desirably, the oriented HMW HDPE films of the present invention have a modulus value in both the machine and cross directions of at least about 300 kg. In one embodiment of the present invention, the oriented HMW HDPE films have a modulus value in the machine direction of from about 200 kpsi to about 300 kpsi. In a further embodiment of the present invention, the oriented HMW HDPE films have a modulus value in the cross direction of from about 200 kpsi to about 300 kpsi.

The present invention is further directed to articles of manufacture made from the above-described oriented HMW HDPE films. In one embodiment, bags for packaging dry foods, such as cereal, are produced from the oriented HMW HDPE films. In packaging applications, the oriented HMW HDPE film may be used alone or in combination with one or more additional layers to form a converted packaging material. In one embodiment of the present invention, a heat seal layer is coextruded with a layer of HMW HDPE making a film for orientation. Desirably, the heat seal layer comprises polymers and their blends including, but not limited to, ethylene-vinyl acetate copolymers (EVAs), ethylene-methacrylic acid salt ionomers, metallocene catalyzed LLDPE, LDPE, and other LLDPE copolymers. The heat seal layer desirably comprises from about 5 to 25 percent of the thickness of the resulting film. Desirably, the thickness of the resulting film is from about 0.8 mils to about 4 mils. The coextrusion may be carried out using either of the blown methods or the cast method described above.

Those skilled in the art will readily understand that the oriented HMW HDPE films of the present invention may be advantageously employed in the preparation of a wide variety of products, including but not limited to, bags, converted composites, etc. Such products may only comprise a single layer of the HMW HDPE film or may comprise a combination of elements as described above. Although the oriented HMW HDPE films of the present invention are particularly suited for packaging applications, the oriented HMW HDPE films may be advantageously employed in a wide variety of consumer products.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

COMPARATIVE EXAMPLE 1

A blown film was prepared by coextruding 85 vol % HMW HDPE (Equistar L4903) having a molecular weight of 2 million, with a 15 vol % heat seal layer comprising EVA copolymer (Dupont 3172). The HMW HDPE had a density of 0.950, a melt index of 0.03 and was extruded at 420° F. (216° C.). The diameter of the die annulus was 20 cm and the die gap was 60 mils (1.5 mm). The length of the neck was 160 cm. The blow up ratio was 3.5. The film was cooled, slit, and taken up as finished rolls on cores, as typically prepared for packaging applications. The film had a thickness of 1.5 mil (37 microns) and had the following properties:

| | |
|---|---|
| MVTR | 0.72 g/100 sq. in./24 hours |
| Tensile strength @ break, MD | 12,000 psi |

-continued

| | |
|---|---|
| Tensile strength @ break, CD | 9,000 psi |
| Elongation @ break, MD | 550 percent |
| Elongation @ break, CD | 880 percent |
| Modulus, MD | 137 kpsi |
| Modulus, CD | 150 kpsi |
| Elmendorf Tear, MD | 50 g |
| Elmendorf Tear, CD | 440 g |
| Scott Puncture Force | 3.1 kg |

EXAMPLE 1

Comparative Example 1 was repeated except that the thickness of the coextruded feed film as blown was 6.75 mil. The coextruded film was subsequently monoaxially oriented in the machine direction to 1.5 mil thickness. More specifically, the blown film in tubular form with sealant side out was passed over heated rolls to increase its temperature to 105° C., and drawn between two pairs of nip rolls heated at 100° C. at a speed ratio of 4.5:1. The orienter in-feed linear speed was 20 meters per minute while the orienter output linear speed was 90 meters per minute. The drawn film was annealed by passing the film over a heated roll at 110° C. The film was then cooled to ambient temperature by passing over a chilled roll having a surface temperature of 20° C. The oriented film had a thickness of 1.5 mils (37 microns) and had the following properties:

| | |
|---|---|
| MVTR | 0.12 g/100 sq. in./24 hours |
| Tensile strength @ break, MD | 37,000 psi |
| Tensile sfrength @ break, CD | 5,100 psi |
| Elongation @ break, MD | 140 percent |
| Elongation @ break, CD | 360 percent |
| Modulus, MD | 300 kpsi |
| Modulus, CD | 260 kpsi |
| Elmendorf Tear, MD | 30 g |
| Elmendorf Tear, CD | 540 g |
| Scott Puncture force | 3.4 kg |

An article was made from the above-described oriented film comprising a vertical form, fill and seal bag, using a sealing temperature of 240° F. (115° C.) on the back fin seal, where the response of the orientation to heat is the most profound. The shrinkage of this back fin seal was observed to be 4.5%.

COMPARATIVE EXAMPLE 2

Example 1 was repeated except MMW HDPE (Equistar 6180) having a molecular weight of 750,000, a density of 0.958, and melt index of 1.15 was used in place of the HMW HDPE. The thickness of the coextruded blown feed film was 4.5 mil and was subsequently machine direction oriented at a speed ratio of 3 to 1. Increasing the speed ratio any further caused the oriented film to split and break in the orienter. The oriented film had the following properties:

| | |
|---|---|
| MVTR | 0.19 g/100 sq. in./24 hours |
| Tensile strength @ break, MD | 12,000 psi |
| Tensile strength @ break, CD | 5,000 psi |
| Elongation @ break, MD | 440 percent |
| Elongation @ break, CD | 700 percent |
| Modulus, MD | 220 kpsi |
| Modulus, CD | 210 kpsi |

-continued

| | |
|---|---|
| Elmendorf Tear, MD | 10 g |
| Elmendorf Tear, CD | 440 g |
| Scott force | 1.6 kg |

An article was made from the above-described oriented film comprising a vertical form, fill and seal bag, using a heat sealing temperature of 240° F. (115° C.) on the back fin seal, where the response of the orientation to the heat is most profound. The shrinkage in this back fin seal was observed to be 27%.

EXAMPLE 2

A cast film was prepared by extruding 85 vol % HMW HDPE (Equistar L4903) with a 15 vol % heat seal layer of EVA copolymer (Dupont 3172). The cast film was extruded at 450° F. (232° C.) through a die of 30 inches width, and of 120 mil (3 mm) die gap. The thickness of the cast film as cooled, and trimmed into finished rolls on cores, was 12 mils. This coextruded film was subsequently monoaxially oriented in the machine direction to a thickness of 2.7 mil at 105° C. and using a speed ratio of 4.5 to 1. The oriented film had the following properties:

| | |
|---|---|
| MVTR | 0.19 g/100 sq. in./24 hours |
| Tensile strength @ break, MD | 37,800 psi |
| Tensile strength @ break, CD | 5,200 psi |
| Elongation @ break, MD | 120 percent |
| Elongation @ break, CD | 400 percent |
| Modulus, MD | 475 kpsi |
| Modulus, CD | 610 kpsi |
| Elmendorf Tear, MD | 100 g |
| Elmendorf Tear, CD | 890 g |
| Scott force | 5.8 kg |

An article was made from the above-described oriented film comprising a vertical form, fill and seal bag, using a heat sealing temperature of 240° F. (115° C.) on the back fin seal, where the response of the orientation to the heat is most profound. The shrinkage in this back fin seal was observed to be 3.5%.

The above examples demonstrate that the machine direction oriented HMWHDPE film of the present invention, whether blown or cast, has superior MVTR compared to blown, unoriented HMW HDPE film, and has superior toughness compared to blown oriented MMW HDPE film.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A machine direction oriented high molecular weight high density polyethylene film having a moisture vapor transmission rate (MVTR) of less than 0.28 g/100SI/day/mil, a tear strength of at least 20 g in both machine and cross directions, and a snapback value of less than 5%, wherein the polyethylene has a weight average and number average molecular weight between about 1.3 million and about 2.9 million.

2. The film of claim 1, wherein the film has a MVTR of less than 0.20 g/100SI/day/mil.

3. The film of claim 2, wherein the film has a MVTR of less than 0.12 g/100SI/day/mil.

4. The film of claim 1, wherein the film has a tear strength of at least 30 g in both machine and cross directions.

5. The film of claim 4, wherein the film has a tear strength of at least 50 g in both machine and cross directions.

6. The film of claim 1, wherein the polyethylene has a weight average and number average molecular weight of from about 1.5 million to about 2.5 million.

7. The film of claim 1, wherein the polyethylene has a density of from about 0.946 g/cc to about 0.968 g/cc.

8. The film of claim 1, wherein the film has been unidirectionally oriented in the machine direction at a draw ratio of from about 2 to about 7.

9. The film of claim 1, wherein the film has a thickness of less than 6 mil.

10. The film of claim 9, wherein the film has a thickness of from about 0.4 mil to about 1.0 mil.

11. A composite film comprising the film of claim 1 and at least one additional layer.

12. The composite film of claim 11, wherein the additional layer comprises a heat seal layer.

13. The composite film of claim 12, wherein the heat seal layer comprises an ethylene-vinyl acetate (EVA) copolymer, an ethylene-methacrylic acid salt ionomer, polypropylene, linear low density polyethylene (LLDPE), low density polyethylene (LDPE), or a blend thereof.

14. A bag comprising the film of claim 1.

15. A machine direction oriented film consisting essentially of high molecular weight high density polyethylene and having a moisture vapor transmission rate (MVTR) of less than 0.28 g/100SI/day/mil, a tear strength of at least 20 g in both machine and cross directions, and a snapback value of less than 5%, wherein the polyethylene has a weight average and number average molecular weight between about 1.3 million and about 2.9 million.

16. The film of claim 15, wherein the film has a MVTR of less than 0.20 g/100SI/day/mil.

17. The film of claim 15, wherein the film has a tear strength of at least 30 g in both machine and cross directions.

18. The film of claim 15, wherein the polyethylene has a weight average and number average molecular weight of from about 1.5 million to about 2.5 million and a density of from about 0.946 g/cc to about 0.968 g/cc.

19. A composite film comprising the film of claim 15, and at least one additional layer.

20. The composite film of claim 19, wherein the additional layer comprises a heat seal layer.

21. A bag comprising the film of claim 19.

22. A bag comprising the film of claim 15.

23. A method of making a machine direction oriented high molecular weight high density polyethylene film, said method comprising:

extruding high molecular weight high density polyethylene to form an extruded film, wherein the polyethylene has a weight average and number average molecular weight between about 1.3 million and about 2.9 million, and monoaxially orienting the extruded film on the machine direction at a draw ratio of from about 2 to about 7; wherein the film has a moisture vapor transmission rate (MVTR) of less than 0.28 g/100SI/day/mil, a tear strength of at least 20 g in both machine and cross directions, and a snapback value of less than 5%.

24. A bag comprising at least one layer of film material, wherein the film material comprises a machine direction oriented high molecular weight high density polyethylene film having a moisture vapor transmission rate (MVTR) of less than 0.28 g/100SI/day/mil, a tear strength of at least 20 g in both machine and cross directions, and a snapback value of less than 5%, wherein the polyethylene has a weight average and number average molecular weight between about 1.3 million and about 2.9 million.

* * * * *